May 15, 1945.  L. L. HARDT ET AL  2,376,249
GASTROSCOPE
Filed Feb. 9, 1944  2 Sheets-Sheet 1
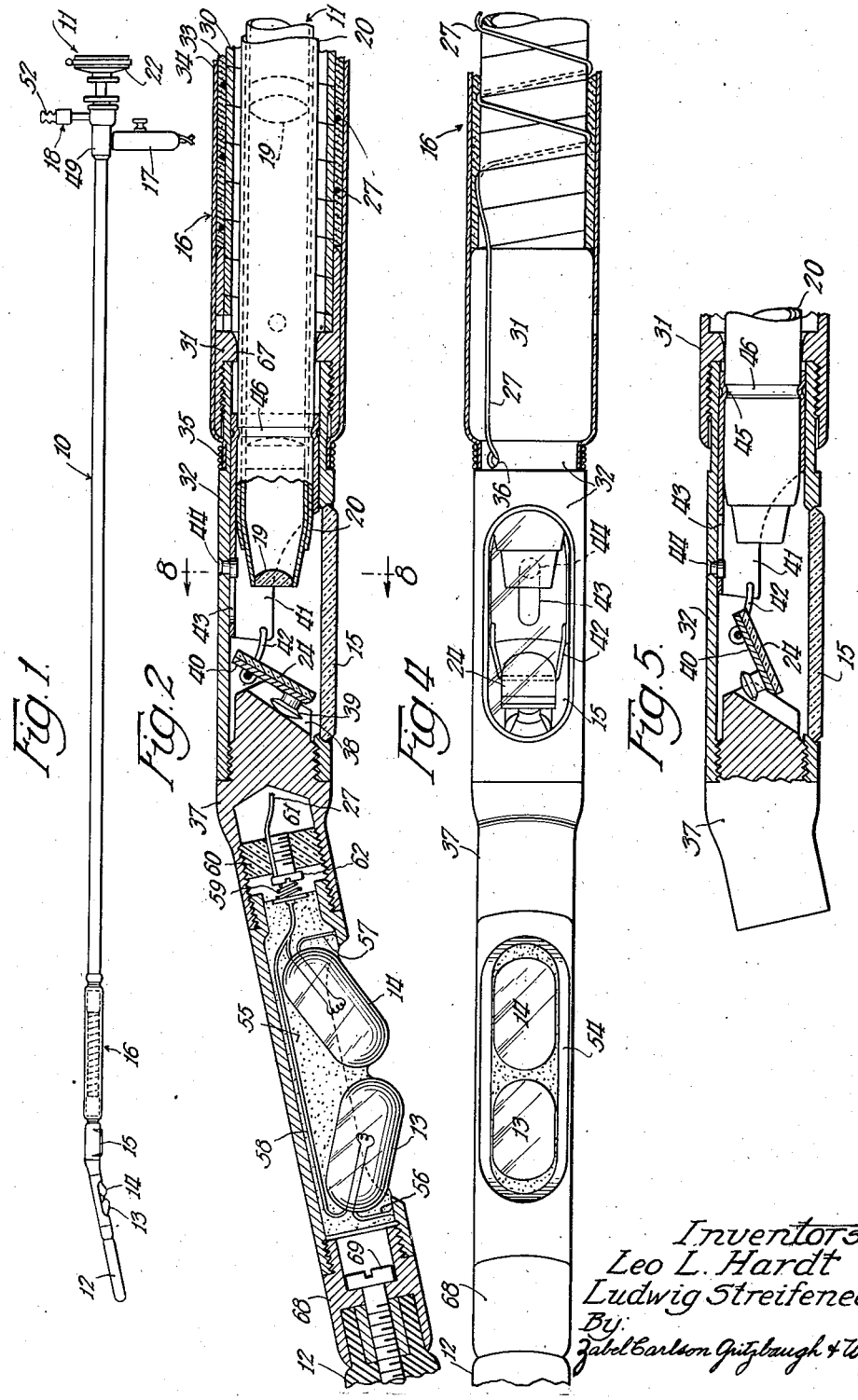
Inventors:
Leo L. Hardt
Ludwig Streifeneder

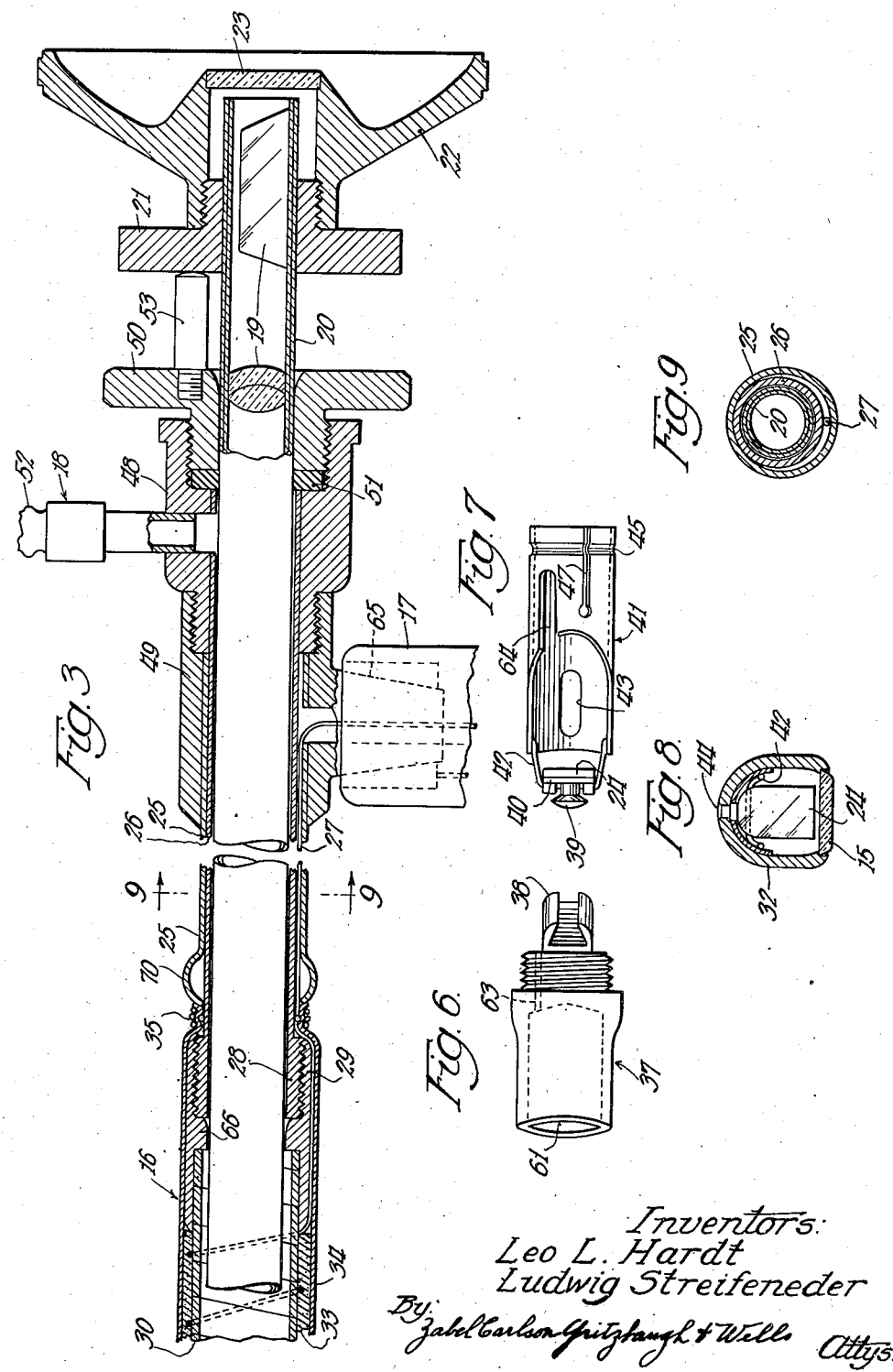

Patented May 15, 1945

2,376,249

UNITED STATES PATENT OFFICE 2,376,249

GASTROSCOPE

Leo L. Hardt and Ludwig Streifeneder, Chicago, Ill.

Application February 9, 1944, Serial No. 521,625

5 Claims. (Cl. 128—8)

This invention relates to improvements in gastroscopes or like instruments for the examination of body cavities, and in particular to an improved construction which is capable of such adjustment that the examiner is enabled to get views of a body cavity at different angles.

The particular type of instrument herein shown and described is a gastroscope which is equipped with an optical system comprising a comparatively large number of aligned optical elements which transmit the image in a straight line to the eye piece. The end of the gastroscope is provided with an opening in the side of a tubular housing, and a mirror is disposed adjacent said opening in order to reflect the line of vision from the optical system to a point outside of the tube.

An object of this invention is to provide an improved means for mounting the aforementioned mirror in such a manner that its angular position may be adjusted so as to obtain retrograde, prograde and intermediate views.

The gastroscope described herein comprises two parts, a sheath, and a removable "scope" which term as used herein refers to the member which embodies the optical system. Another object of this invention is to provide means for removably associating the scope with the aforesaid adjustable mirror mounting so that the angular position of the mirror may be regulated by sliding the scope to and fro within the sheath.

A further object is to provide improved means for adjustably mounting a mirror opposite the end of a removable scope in such a manner that the mirror remains substantially centered with respect to the optical axis of the scope even though it is caused to assume different angular positions.

Other objects, features and advantages of this invention will become apparent as the description proceeds. With reference now to the drawings which form a part of this application, and in which like reference numerals designate like parts—

Fig. 1 is a plan view of a preferred embodiment of this invention;

Fig. 2 is an enlarged sectional view of the lower end of the gastroscope shown in Fig. 1;

Fig. 3 is an enlarged sectional view of the upper end thereof;

Fig. 4 is an elevation, partly in section, of Fig. 2;

Fig. 5 is a section similar to Fig. 2 but showing the parts in a changed position;

Figs. 6 and 7 are elevations of certain details; and

Figs. 8 and 9 are sections taken along lines 8—8 and 9—9 of Figs. 2 and 3, respectively.

With reference now to Fig. 1, the gastroscope comprises a sheath designated generally by the reference numeral 10, and a scope 11 which fits within the sheath, only the upper end of the scope being visible in Fig. 1. Various features of the sheath as they appear in Fig. 1, reading from left to right, are a flexible tip 12, preferably made of rubber, lamps 13 and 14, a window 15, a flexible section 16, and electrical plug 17, and an air inlet 18.

The scope includes a series of optical elements, such as lenses and prisms 19, as shown in Figs. 2 and 3, which are mounted in a double tube 20. A flanged sleeve 21 is carried at the upper end of the double tube 20, and an eye piece 22 is screw-threaded onto the flanged sleeve 21. The eye piece 22 includes a window 23 which serves to keep dust out of the optical system 19. The scope fits within the sheath, and is adjustable both longitudinally and rotationally. A mirror 24 is disposed behind the window 15 so that objects without the gastroscope can be reflected into the line of vision of the scope and may be seen by the examiner.

The major portion of the length of the scope comprises an outer tube 25, an inner tube 26, the latter being electrically disposed with respect to the former so as to provide a passage for an insulated wire 27. The outer tube 25 terminates at its lower end somewhat short of the inner tube 26, and the latter terminates in an enlarged threaded portion 28 to which a sleeve 29 is threaded. The sleeve 29 may be provided with a groove for the reception of the wire 27.

The flexible section 16 comprises a helix 30 which is covered by two sections of flexible tubing, such as rubber, designated by reference numerals 33 and 34. The upper end of the helix 30 is seated in the sleeve 29, and the lower end in a sleeve 31, to which lower sleeve is secured a comparatively short tubular member 32 in which the window is set, and within which the mirror 24 is disposed. The flexible tubing 34 overlies the tubing 33 and extends beyond the sleeves 29 and 31, and is secured at its ends to the inner tube 26 and the tubular section 32 respectively by whipping 35. By means of this construction the flexible section presents a smooth and non-irritating surface, and is sealed in airtight relationship.

The wire 27 is helically disposed between the helix 30 and the flexible tube 33 and passes through a groove formed in the surface of the sleeve 31, and then enters into the interior of the short tubular section 32 through a perforation 36. It will thus be seen that this helical disposition of the wire 29 does not impede the flexibility of the flexible section 16.

The mirror 24 is mounted on a mirror plate 40, the latter being supported at both ends so that the angular position of the mirror may be shifted. The lower end of the short tubular section 32 is closed by a plug 37, which plug is provided with a mortised extension which forms a guide 38 for a button 39 which projects from the lower portion of the mirror plate 40. The upper portion of the mirror plate is supported by a wire hanger 42, the free ends of which are pivotally mounted in a sliding member 41. The sliding member conforms itself to the cylindrical shape of the interior of the short tubular section 32. It is provided with a slot 43 through which a rivet 44 extends, the rivet being anchored in the short tubular section 32. This construction limits the movement of the sliding member 41, and consequently the angular movement of the mirror 24, the extreme positions of which are shown in Figs. 2 and 5 respectively.

The inner surface of the sliding member 41 is provided with an angular rib 45 which cooperates with a groove 46 formed in the lower end of the scope 11. The sliding member 41 is slotted as indicated at 47 in Fig. 7, to provide the necessary give so that the scope 11 may be easily slipped into and withdrawn from engagement with the sliding member 41. It will be seen, therefore, that sliding the scope 11 inwardly, after it has engaged the rib 45 to the limit of its motion, will cause the mirror 24 to assume the retrograde position, and withdrawing it to that point where a slight resistance indicates engagement of the rivet 44 with the end of the slot 43 will cause the mirror to assume the prograde position. Of course the mirror may be caused to assume various intermediate positions.

Bushing 48 is provided at the upper end of the scope for the inner tube 26, and another bushing 49 is provided for the outer tube 25, the bushings being screw-threaded to each other and serving to maintain the eccentricity of the inner and outer tubes. It will be noted that the lower end of the outer tube 25 is bent inwardly into engagement with the inner tube 26 to help maintain this eccentricity at the lower end of the tubes, as indicated by the reference numerals 70.

A flanged member 50 is threaded into the bushing 48 and a packing member 51 is confined between the flanged member and the bushing. A nipple 52 is inserted in the bushing 48 to permit the introduction of air into the space between the scope 11 and the sheath 10 so that air may be forced downwardly to the lower end of the gastroscope where it may escape through the threads between the plug 37 and the short tubular section 32 to dilate the stomach, thereby assisting in the examination thereof. The packing 51 prevents the escape of air at the upper end of the gastroscope.

A pin 53 is screwed into the flange of the flanged member 50 and engages the flanged sleeve 21 to limit the inward motion of the scope with respect to the sheath. This prevents any damage to the parts which might result from forcing the scope inwardly against the resistance of the rivet 44. In practice, the length of one scope will vary somewhat with respect to another due to variations in the optical elements 19, and hence each scope must be individually fitted to its respective sheath, and the pin 53 ground down to the appropriate length.

The lamps 13 and 14 are mounted in a cutaway tubular section 54, which is threaded onto the plug 37, the lamps being embedded in an insulating plastic composition 55 in such a manner that they project slightly beyond the surface of the gastroscope. Each lamp is provided with a conductor to ground designated by reference numerals 56 and 57 respectively, and they are also connected by a lead 58 to a contact member in the form of a spring 59.

The lower end of the plug 37 is recessed as indicated at 61 and threaded in order to receive the cutaway section 54, and also to receive a Bakelite plug 60. A contact screw, for cooperation with the contact screw 59, is embedded in the Bakelite plug to afford electrical contact with the lamps 13 and 14. The lower end of the wire 27 is secured to the contact screw 62 as it passes through a bore 63 in the plug 37 into the interior of the short tubular section 32 and the sliding member 41, from which it is led outwardly through the perforation 36 as hereinbefore described. The sliding member 41 is also provided with a slot 64 for the wire 27.

A conical projection 65 on the bushing 49 affords means on which the electrical plug 17 may be removably mounted. From the flexible section 16 the wire 27 passes through the space between the outer and inner tubes 25 and 26, and then up through the conical projection 65 to a suitable contacting means, not shown, for cooperation with the plug 17. The other side of the lamp circuit is grounded on the gastroscope proper as indicated above.

The sleeves 29 and 31 are provided with bushings 66 and 67 respectively, by means of which the scope 11 may be centered in the sheath. The flanged member 50 and the packing 51 also serve to position the scope at the upper end. By tightening up on the packing 51 there will be sufficient friction on the scope so that it will maintain whatever longitudinal position to which it is adjusted, thereby maintaining the mirror 24 steady in any angular position.

The flexible tip 12 is mounted in a mounting member 68 to which it is secured by a screw 69, as shown in Fig. 2.

The operation of the various parts has been described in detail. When an examination is to be made, the scope is first removed from the sheath and the sheath 10 is then inserted into the patient's throat until the window 15 is received within the stomach. The flexible tip 12 assists in determining this position, and due to its flexibility avoids undue irritation of the stomach. The flexible section 16 assists in the insertion of the sheath. Then the scope 11 is inserted in the sheath, and this serves to straighten out the flexible section 16. As the scope is positioned into its final position, the rib 45 will engage the lower end of the scope so that there is operative connection between the scope and the mirror. The plug 17 may then be attached, thereby lighting the lamps 13 and 14. If it is desired to dilate the stomach, air may be introduced through the nipple 52, the flanged member 50 being first tightened up.

It will be seen that by means of the construction herein described and shown, views may be taken at various angles ranging from about 20° to 70° from the axis of the scope, and that this is done without causing any prism or other reflecting element to be projected from the confines of the gastroscope into the stomach. All of the operating mechanism is wholly confined within the sheath and there is no possibility of the stomach fluids entering into the scope and damaging the mechanism or clouding the optical elements.

Although only one preferred embodiment of this invention has been shown herein, it will be understood that various modifications and changes may be made without departing from the spirit of this invention. The drawings and the foregoing description are illustrative only and the invention is to be limited only by the appended claims.

We claim:

1. A gastroscope comprising a sheath having a window at the lower portion thereof, and a mirror disposed within said sheath and adjacent said window, said mirror being mounted for angular adjustment, and a removable scope slidably disposed within said sheath and optically aligned with said mirror, and means connecting said mirror and said scope to regulate the angle of vision through said window.

2. A gastroscope comprising a sheath and a removable scope, a mirror within said sheath at the lower end thereof opposite the end of said scope, a guide in which one end of said mirror may be slidably mounted, a sleeve slidably mounted within said sheath and carrying pivotally mounted means for supporting the other end of said mirror, said sleeve being adapted to receive the end of said scope, and means for providing interlocking engagement between said sleeve and said scope so that sliding movement of said scope will be transmitted to said sleeve for angular adjustment of said mirror.

3. In a gastroscope, a mirror located at the lower end thereof and wholly within the confines thereof, and means for supporting said mirror at its two ends, one of said supporting means constituting a guide to permit sliding movement of said mirror in one direction, and the other of said supporting means being shiftable in another direction so that the angular disposition of the mirror within said gastroscope may be adjusted.

4. A gastroscope comprising a tubular member, a transparent wall section disposed in said tubular member at the lower end thereof, a mirror mounted within said tubular member opposite said transparent wall section, a channel disposed within said tubular member adjacent said mirror, means near one edge of said mirror loosely engaging said channel so as to permit angular movement of said mirror with respect to said channel, a sliding member disposed within said tubular member, and a link connected between said sliding member and the opposite edge of said mirror so that operation of said sliding member will cause angular adjustment of said mirror and will maintain the same in substantially centered relationship with respect to said tubular member in which the mirror is mounted.

5. A gastroscope comprising a sheath, a removable scope slidably mounted within said sheath, a transparent wall section in the lower portion of said sheath beyond the end of said scope, a sleeve mounted for sliding movement at the lower end of said sheath, means to limit the sliding motion of said sleeve, a rib on said sleeve, a corresponding groove on the end of said scope whereby the end of said scope may be fitted into said sleeve in interlocking engagement, and means to limit the inwardly sliding movement of said scope, said means being effective to permit the forcing of said groove over said rib when said sleeve is at the lower limit of its motion, and the engagement between said rib and said groove being such as to indicate the extreme upper limit of the motion of said sleeve by an increased resistance to continued upward sliding movement of said scope, but said engagement not being such as to prevent the disengagement of said scope from said sleeve.

LEO L. HARDT.
LUDWIG STREIFENEDER.